Patented Dec. 9, 1952

2,621,161

UNITED STATES PATENT OFFICE 2,621,161

MAKING GAS-EXPANDED ORGANIC PLASTICS

Lester C. Kulp and Edward C. Van Buskirk, South Bend, Ind., and Byron A. Hunter, Oxford, Conn., assignors to United States Rubber Company, New York, N. Y., a corporation of New Jersey No Drawing. Application February 23, 1950, Serial No. 145,886

10 Claims. (Cl. 260—2.5)

This invention relates to the manufacture of cellular rubber and plastics, and more particularly to the manufacture of chemically blown cellular rubber and chemically blown plastics.

In the manufacture of blown cellular rubber a gassing agent or compound capable of liberating gases at the temperature of vulcanization is required. Similarly, in the manufacture of blown cellular plastics a gassing agent or compound capable of liberating gases at the molding temperature is required. The gases produced are responsible for the properties of the blown materials and the characteristics of their cellular structure.

Many gassing agents are known, such as ammonium sulfite, ammonium carbonate, sodium bicarbonate, etc. but they have not been fully satisfactory and for this reason there has been a continued search for better chemical blowing agents. Use of prior art blowing agents has been attended by various disadvantages. One of the principal disadvantages has been that the blowing agents of the prior art have not given the desired uniform structure and small cell size desired in the blown product. Another disadvantage is that they have not given consistent results but on the contrary there have been wide variations between successive batches made with the same formulation. Another disadvantage is that they have not given consistent results but on the contrary there have been wide variations between successive batches made with the same formulation. Another disadvantage is that many of the prior art blowing agents have caused objectionable discoloration of the blown product and have resulted in objectionable staining of other materials coming in contact with the blown product. Still another disadvantage is an objectionable tendency on the part of many blowing agents used heretofore to liberate their gases prior to vulcanization or molding because of too low decomposition temperature. Closely associated with this disadvantage is a tendency toward variations in the finished product because of changes in the properties of the blowing agent brought about by ordinary atmospheric conditions, for example during storage prior to incorporation in rubber or plastic. Still another objection to prior art blowing agents is their low blowing efficiency which necessitates use of excessively large quantities of the blowing agent in order to manufacture a given volume of blown product.

We have now discovered that hydrazine ($NH_2$—$NH_2$), either as such or in the form of hydrazine hydrate or hydrazine salts, is an unusually effective blowing agent. When hydrazine, hydrazine hydrate or a salt of hydrazine is incorporated with rubber or other organoplastic and the resulting mixture is heated to cause decomposition of the hydrazine, hydrate or salt thereof, the latter evolves gas and gives a blown cellular product having an unusually satisfactory structure. The blown product made by our invention is particularly characterized by its fine uniform cellular structure. The blowing agents of the present invention present many other advantages some of which will be enumerated hereinafter.

In the practice of our invention we can use hydrazine itself. However since it is a fuming liquid of a caustic nature, it is difficult to handle in the factory and for this reason may be considered undesirable for commercial use. Hydrazine hydrate is somewhat more desirable than hydrazine but still possesses the undesirable caustic property of hydrazine itself. Furthermore, we have discovered that although hydrazine or hydrazine hydrate gives a blown product having fine uniform cell structure, even when used in a rubber mix containing no organic carboxylic acid, typified by the fatty acid, such as stearic or oleic acid, which is commonly used in rubber mixes which are to be blown, nevertheless the volume increase or blowing efficiency of hydrazine or hydrazine hydrate is, generally speaking, not as great as is the case when the hydrazine is used in the form of a salt such as a salt of a carboxylic acid, or is used in conjunction with an acid, such as a carboxylic acid like stearic or oleic acid capable of forming such a hydrazine salt in situ. In addition, the use of hydraizne in the form of its salts rather than in the form of hydrazine itself or its hydrate, offers many other advantages.

We prefer to employ a hydrazine salt of a carboxylic acid in the practice of our invention. Such salts of hydrazine may, as is well-known, be made by simply admixing hydrazine itself or hydrazine hydrate with a carboxylic acid. Preferably the hydrazine base or hydrate thereof and the carboxylic acid are employed in such proportions that there is present substantially one mol of hydrazine for each carboxylic acid group in the acid. Thus in the case of a monocarboxylic acid, it is preferred that substantially one mol of hydrazine be used per mol of acid, while in the case of dicarboxylic acids, it is preferred that substantially two mols of hydrazine be used per mol of acid. Similarly, in the case of tribasic acid, e. g., citric acid, we prefer to use substantially three mols of hydrazine per mol of acid. However, it is not essential that these preferred molar proportions be used since an excess of either the hydrazine or the carboxylic acid does no harm if the cure rate of the rubber mix is properly adjusted, as described hereinafter.

Any carboxylic acid salt of hydrazine may be used in the practice of our invention. One class of such salts includes the hydrazine salts of the aliphatic saturated monocarboxylic acids typified by formic, acetic, propionic, butyric, valeric, caproic, caprylic, capric, lauric, myristic, palmitic, and stearic acid. The hydrazine salt of formic acid made by reacting one mol of hydrazine with one mol of formic acid (for example, the anhydrous salt obtained by adding one mol of anhydrous hydrazine to one mol of anhydrous formic acid in alcohol, removing the oily liquid that separates, washing it with ligroin and warming it under vacuum to remove retained solvent) is a neutral, water-white, free-flowing liquid having an exceptionally high blowing strength per unit weight and may be preferred by many users. Instead of the saturated aliphatic monocarboxylic acids we may use unsaturated aliphatic monocarboxylic acids especially those which are commonly designated fatty acids because they occur naturally in fats or oils as the glycerides, including monoolefinic acids typified by undecylenic acid and oleic acid, diolefinic acids such as linoleic acid, and triolefinic acids such as linolenic acid and elaeosteric acid. While the unsubstituted aliphatic monocarboxylic acids are generally used, they may be substituted with substituent groups which do not adversely affect the blown product; for example we can employ the hydrazine salt of ricinoleic acid which is a hydroxy substituted unsaturated fatty acid. We may use hydrazine salts of aliphatic polycarboxylic acids, typified by oxalic, malonic, succinic, glutaric, adipic, pimelic, suberic, azelaic, sebacic, malic, tartaric, and citric acids. We may use hydrazine salts of aromatic mono- and polycarboxylic acids such as benzoic, salicylic, acetylsalicylic and phthalic acids.

We have found that di hydrazine oxalate (2:1) is a very satisfactory blowing agent. Like the formate (1:1), it contains a high proportion of combined hydrazine base and so may be used in smaller amounts to achieve a specified blowing effect; in addition, it is a pulverulent, non-hygroscopic solid and is easily prepared in good yield from commercial hydrazine. Instead of di hydrazine oxalate, we can also use mono hydrazine oxalate (1:1).

As described below, hydrazine salts of inorganic acids can be used in practicing our invention. Any inorganic acid can be used, examples being sulfuric acid, hydrochloric acid and phosphoric acid. Generally, from one-half to two mols of hydrazine are employed per mol of acid. We have successfully used mono hydrazine phosphate (1:1), mono hydrazine hydrochloride (1:1), hydrazine di hydrochloride (1:2), mono hydrazine sulfate (1:1) and di hydrazine sulfate (2:1), but these are merely illustrative.

Inasmuch as hydrazine is a di-acid base, it is capable of forming salts containing both one and two equivalents of acid. Generally speaking, we have found that the salt containing the larger proportion of hydrazine is the more effective blowing agent.

It will be understood by those skilled in the art that, in the case of rubber, it is essential for satisfactory results that the compound and the blowing technique be so adjusted as to achieve the proper balance between curing and evolution of gas. If the stock cures too rapidly, the rubber attains too high a modulus before the desired degree of gassing occurs with the result that the desired blow is not obtained. On the other hand, if the stock cures too slowly, the gas escapes with collapse of the cellular structure.

For example, mono hydrazine sulfate, which is acidic, retards vulcanization so that for best results the rate of acceleration should be increased either by using more accelerator or by adding an alkaline material. The same is true of all hydrazine salts having an over-all acidic reaction. On the other hand, hydrazine and hydrazine salts having an over-all alkaline reaction, such as di hydrazine oxalate, accelerate the cure and when they are used the cure should be balanced either by the use of a lower concentration of accelerator or by the addition of an acidic material.

Instead of hydrazine salts of carboxylic acids, we may use any other hydrazine salts in the practice of our invention, such as hydrazine salts of non-carboxylic organic acids, for example, hydrazine dithiocarbazinate which is the hydrazine salt of the hypothetical acid—hydrazine dithiocarbamic acid—has the formula

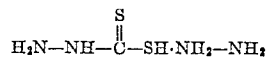

and is made by reacting two mols of hydrazine with one mol of carbon disulfide, hydrazine benzene sulfonate, hydrazine toluene sulfonate, hydrazine salts of carbonic acid or its anhydride ($CO_2$) such as hydrazine carbazinate, hydrazine salts of carbamic acids, and hydrazine salts of inorganic acids, e. g., sulfuric, hydrochloric, phosphoric, etc. In the case of polybasic inorganic acids, we generally prefer to follow the principle above set forth for the polycarboxylic organic acids. Thus, in the case of sulfuric acid, we generally secure better results by using 2 mols of hydrazine per mol of $H_2SO_4$ than we do when equimolar proportions are used, although again such differences can be largely obviated by the proper adjustment of the rate of cure of the rubber mix. Nevertheless, in the interest of most effective blowing and minimum introduction of non-blowing agents, i. e., the inorganic acid, serving no useful purpose in the rubber mix, we prefer to use salts containing the maximum proportion of combined hydrazine.

Although the chemistry of the hydrazine salts of the various acids is not yet fully known with certainty, it is believed that such salts are addition products. For example the hydrazine salts of the aliphatic saturated monocarboxylic acids are generally assigned the structural formula $NH_2\text{—}NH_2 \cdot RCOOH$ where R is hydrogen or alkyl. However, regardless of the chemical structure of hydrazine salts, they are well-known chemicals and the method of making them is also well-known.

When hydrazine or hydrazine hydrate is simply treated with the acid, there is formed a solid or liquid salt which exhibits the blowing properties of the free hydrazine base (or of hydrazine hydrate) and yet is completely free from the undesirable caustic property of hydrazine or its hydrate. In addition, the salts of hydrazine are non-discoloring, non-staining, and free from other objectionable properties in the resulting cellular product.

One method of producing the salts of hydrazine involves dissolving hydrazine or hydrazine hydrate in a suitable solvent and mixing this solution with a solution of the acid in the same solvent. Ethyl alcohol has been found to be a suitable medium for the preparation of many of these salts because the salts are, generally speaking, quite insoluble in this solvent so that they can be readily separated. Other solvents can of course be used and the method of recovery of the salt can be modified in accordance with procedures understood by those skilled in the art.

In some instances, the salts of hydrazine may be formed in situ in the organoplastic mixture. For example, the fatty acids, such as stearic acid, oleic acid, or the like which are commonly employed in the compounding of rubber stocks including stocks which are to be chemically blown, may be incorporated in a rubber mix with which there is also incorporated hydrazine or hydrazine hydrate. Incorporation of these two materials in the rubber mix results in the formation of the hydrazine salt of the fatty acid used, and the hydrazine contained in this salt is then available during subsequent blowing and vulcanization to give the advantages of the present invention.

The amount of the blowing agent employed in the practice of our invention may vary within wide limits depending upon the form in which the hydrazine is used, the particular rubber or plastic with which it is used, the blowing conditions, the density desired in the blown product, and other factors. In the case of rubber we generally use an amount of the blowing agent such as to provide from 0.1 to 5.0 parts of hydrazine base ($NH_2$—$NH_2$) per 100 parts of rubber. We have obtained very satisfactory results using the blowing agent in an amount corresponding to 0.5 part of hydrazine base per 100 parts of rubber.

Any type of rubber which is curable or vulcanizable to a solid state may be blown in accordance with our invention. Examples are natural rubber and synthetic rubbers such as rubbery copolymers of butadiene with styrene or acrylonitrile (known as GR-S and Buna N, respectively), rubbery copolymers of isobutylene with a small proportion of butadiene or isoprene (known as Butyl rubber), and polychloroprene. With the rubber is or are incorporated the usual compounding ingredients including curing or vulcanizing agents, such as sulfur, accelerators, activators, antioxidants, plasticizers, softeners, pigments, fillers, dyestuffs, etc.

Our invention may be employed to expand any organoplastic material which is capable of setting to a normally solid state and having sufficient consistency and tensile strength under the conditions of the expansion step to retain the evolved expanding gas and the resulting expanded structure.

Examples of organoplastic materials other than rubber which may be expanded in accordance with our invention are resins such as alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters for example cellulose acetate, cellulose ethers such as ethyl cellulose, etc. The organoplastic may be of either the thermoplastic or the thermosetting type and it may be of a type of which polymerization is furthered or completed during the step of heating to generate the gas from the blowing agent.

Our invention can be conveniently applied to the manufacture of gas-expanded plasticized resin articles from plastisols which, as is well-known, are paste-like mixtures of unplasticized resin particles with a plasticizer therefor which does not dissolve the resin at ordinary temperature, but which exhibit the characteristic that upon being heated to moderately elevated temperatures (of the same order as the temperatures at which the chemical blowing agent decomposes to generate the expanding gas) the plasticizer dissolves the resin and forms a gel which upon cooling to room temperature assumes a solid condition. Such gas-expanded plasticized resin articles are commonly made by mixing the chemical blowing agent with the plastisol, filling a mold cavity formed by a sectional mold with the resulting paste-like mixture, closing the mold under high pressure, and "preheating" the mixture in the mold cavity to effect simultaneous gelation of the plastisol and generation of the blowing gas from the blowing agent, cooling the article in the mold, removing the molded miniature article, and expanding it to final form by immersing it in a heated fluid medium in which it is free to expand. This final expansion step softens the resin to such an extent that the gas contained under pressure in very small pores in the pre-molded article can cause the pores to become greatly enlarged. Upon cooling, the final article retains its final expanded shape.

In the case of organoplastics other than rubber, we may employ a proportion of the blowing agent falling within the range given above for rubber, but we usually employ a proportion considerably higher than in the case of rubber, for example from 5 to 30 parts of hydrazine base per 100 parts of organoplastic.

Our experience to date indicates that the hydrazine blowing agents of our invention perform far more satisfactorily in expanding rubber to cellular form than they do with other organoplastic materials. We are unable at present to explain the reason for the remarkable effectiveness of hydrazine and its salts as blowing agents in rubber as compared to other organoplastic materials. Our invention is particularly surprising in view of the fact that hydrazine is reported to remain undecomposed under 350° C. (Mellor, "A Comprehensive Treatise on Inorganic and Theoretical Chemistry," vol. 8, p. 311).

The hydrazine blowing agents of the present invention can, if desired, be used in conjunction with other blowing agents such as sodium bicarbonate. However, in general the quality of the product obtained by use of a hydrazine blowing agent of the present invention together with sodium bicarbonate is not as good as that obtained when the sodium bicarbonate is not employed.

It is preferred to effect the incorporation of the hydrazine blowing agents of the present invention with the rubber or other organoplastic at temperatures below 160° F. and to keep the resulting stock at temperatures below 160° F. prior to blowing. The reason for these precautions is to prevent premature decomposition of the blowing agent and resultant loss of blowing efficiency.

Another important precaution which should be observed when blowing rubber by our invention is that the hydrazine blowing agent and the sulfur should be separately incorporated in the rubber mix because of their marked tendency to react with one another if incorporated together.

By incorporating the sulfur and the hydrazine blowing agent at separate times, contact of high concentrations of sulfur with high concentrations of the hydrazine blowing agent with consequent interaction is avoided.

Aside from the precautions mentioned in the last three paragraphs, standard methods of formulating mixes to be blown may be employed in the practice of the present invention.

The method of carrying out the blowing step need not be described in detail because such methods are well-known to those skilled in the art and because the method of conducting the blowing does not per se constitute any part of the present invention which resides in the use of the novel blowing agents described herein and not in any particular method of blowing. However, it can be stated generally that we proceed by intimately incorporating the hydrazine blowing agent with the organoplastic material, shaping the resulting mixture to the form desired prior to blowing, as by sheeting followed by cutting, or by partially or completely filling a mold cavity with the mixture, and heating the shaped mixture and thereby effecting decomposition of the hydrazine blowing agent in the mixture with evolution of the blowing gas therefrom, the blowing being carried out under such conditions that the blowing gas so generated is at least partially retained in the mixture and effects expansion of the mixture. The method of processing may be varied in accordance with techniques well-known to those skilled in the art, to produce either a closed-cell product or an open-cell product, i. e., a product in which the cells communicate with one another, or a combination of closed-cell and open-cell structures.

In general, the first step of a blowing process carried out in accordance with our invention involves intimately and uniformly mixing the hydrazine blowing agent of our invention with the organoplastic material, with or without other desired materials such as polymerization catalysts, plasticizers, softeners, fillers, pigments, stabilizers, and, in the case of rubber, antioxidants, vulcanizing ingredients such as sulfur and vulcanization accelerators and activators of vulcanization, especially combined zinc activators, particularly zinc salts of fatty acids or mixtures of zinc oxide and fatty acids capable of forming zinc soaps of fatty acids in situ, other curatives and cure regulators, etc. This mixing can be done on an open roller mill or in an internal mixer such as a Banbury mixer or in any other suitable manner. The resulting mixture of organoplastic material and the undecomposed hydrazine, hydrazine hydrate or hydrazine salt is then shaped into the blank form desired for blowing. The shaping can be accomplished by sheeting on a calender, or by extruding, and subsequently cutting to the desired length or shape. The shaped blank is then placed in a mold where it is heated to effect decomposition of the blowing agent and expansion of the mixture by the evolved gas. The blowing may be carried out in accordance with what is known as a "free blow" mode of operation, the mold cavity being larger than the final expanded article so that the expanding mix is at all times free to expand; alternatively, the blowing may be effected in such a manner that the expanding mix is tightly confined. In the latter case, the resulting article can be cooled in the mold, removed, and heated outside the mold to expand it to final shape.

The temperature used in the blowing or expanding step of the present invention may be any temperature at which the blowing agent of the present invention is caused to decompose and generate blowing gas together with any other desired effect such as partial or complete vulcanization of a rubber mix, advancement of polymerization, etc. Thus, in the case of vulcanizable rubber mixes, the temperature is commonly such as to simultaneously decompose the blowing agent and vulcanize the rubber at least sufficiently to cause it to retain the liberated gas. In the case of a plastisol, the temperature may be such as to simultaneously decompose the blowing agent and gelatinize the plastisol. Temperatures of the order of 300° F. to 400° F. are commonly employed in effecting the decomposition of the blowing agent and consequent expansion of the mix in the practice of our invention.

The following examples illustrate our invention in more detail.

*Examples 1 to 14*

The following series of blown rubber stocks was made in order to demonstrate the effectiveness of hydrazine, hydrazine hydrate and hydrazine salts as blowing agents. The compound used in these examples was designed and processed to have the least possible number of variables. As previously indicated, one of the major advantages of the use of the blowing agents of the present invention is the fine uniform cell structure produced. For this reason this series was judged primarily on the basis of cell structure. For proper comparison, the stocks were blown in a mold to a given density range where possible. The amount of hydrazine or hydrazine salt used in Examples 2 to 14 was so selected that the compound before blowing contained 0.5 part hydrazine ($NH_2$—$NH_2$) per 100 parts of rubber.

To secure uniformity of the basic material, a large master batch of the following formula was prepared and subdivided into portions for the individual tests:

| | |
|---|---|
| Pale crepe rubber | 100.0 |
| Limestone | 70.0 |
| Zinc oxide | 5.0 |
| Zinc diethyldithiocarbamate—accelerator | 0.1 |
| Benzothiazyl disulfide—accelerator | 1.07 |
| Paraffin oil | 5.0 |
| | 181.17 |

The master batch was made on the rubber mill in the usual way. Separate portions were then blended first with sulfur and then with the ingredients shown in the following table whereupon the stocks were cured in the same mold for 10 minutes at 315° F. The data are shown in the following table.

| Example | 1 | 2 | 3 | 4 | 5 | 6 | 7 |
|---|---|---|---|---|---|---|---|
| Masterbatch | 181 g | 181 g | 181 g | 181 g | 181 g | 181 g | 181 g. |
| Sulfur | 3.0 | 3.0 | 3.0 | 3.0 | 3.0 | 3.0 | 3.0. |
| Stearic acid | 6.0 | 6.0 | 6.0 | 6.0 | 6.0 | 6.0 | 6.0. |
| Sodium bicarbonate | 9.0 | 9.0 | 9.0 | | | | |
| Hydrazine mono hydrate (85%) | | 0.94 | 0.94 | | | | |
| Hydrazine base (94%) | | | | 0.53 | 0.53 | | |
| Mono hydrazine sulphate | | | | | | 2.03 | |
| Di hydrazine sulphate | | | | | | | 1.27. |
| Scott plasticity (212° F.—1 lb./1 min.) | 276 | 102 | 170 | 158 | 126 | 332 | 126. |
| Cell structure | Very coarse | Fine—Some holes | Very fine | Very fine | Very fine | Fine to coarse | Fine. |
| Mold full or not full | Full | Full | Full | Not full | Full | Not full | Full. |
| Density in lbs./cu. ft | 23.3 | 23.3 | 23.8 | 33.2 | 23.2 | 30.0 | 24.6 |

| Example | 8 | 9 | 10 | 11 | 12 | 13 | 14 |
|---|---|---|---|---|---|---|---|
| Masterbatch | 181 g | 181 g | 181 g | 181 g | 181 g | 181 g | 181 g. |
| Sulfur | 3.0 | 3.0 | 3.0 | 3.0 | 3.0 | 3.0 | 3.0. |
| Stearic acid | 6.0 | 6.0 | 6.0 | 6.0 | 1.5 | 6.0 | 6.0. |
| Hydrazine di hydrochloride | 1.64 | | | | | | |
| Di hydrazine oxalate | | 1.24 | | | | | |
| Hydrazine mono formate | | | 1.22 | | | | |
| Hydrazine mono acetate | | | | 1.44 | | | |
| Hydrazine mono stearate | | | | | 5.0 | | |
| Hydrazine mono benzoate | | | | | | 2.4 | |
| Hydrazine mono salicylate | | | | | | | 2.66. |
| Scott plasticity (212° F.—1 lb./1 min.) | 102 | 140 | | 156 | | | |
| Cell structure | Medium to coarse | Fine | Fine | Fine | Fine | Fine to medium | Fine to medium. |
| Mold—full or not full | Full | Full | Full | Full | Full | Full | Full. |
| Density in lbs./cu. ft | 22.4 | 24.2 | 25.4 | 23.4 | 25.4 | 22.0 | 23.1. |

While plasticities are reported in the foregoing table, it should be pointed out that plasticities of rubber compounds which are to be blown are at best somewhat questionable due to the softness of the stock and the tendency of the stock to start blowing at the temperature used for testing the plasticity. However, a study of the plasticities of this series indicates that the addition of hydrazine, its hydrate and salts to a rubber compound substantially increases the nerve and decreases the plasticity of the uncured compound.

The product of Example 1, which was a comparison sample blown with sodium bicarbonate had an extremely coarse texture. By the addition of 0.94 part of 85% hydrazine mono hydrate to the compound used in Example 1, the remarkable transformation evident from Example 2 was achieved. The product of Example 2 was characterized by its fine, even cellular texture which is typical of cellular products made by the present invention.

Example 3 was identical with Example 2 except that the nine parts of sodium bicarbonate were omitted. The product had an even better texture than the product of Example 2.

Example 4 shows that the presence of stearic acid or some other carboxylic acid in conjunction with the hydrazine is highly desirable although its presence is not absolutely required since the product of Example 4 did have an extremely fine uniform cellular structure despite the fact that density was relatively high. This difficulty could easily be overcome by appropriate adjustment of the curing rate.

Example 5 was identical with Example 4 except that six parts of stearic acid were included in the formulation. The product had a remarkably fine even cellular texture and a low density.

Example 6 which was blown with mono hydrazine sulfate was not a particularly good product. The cell structure was non-uniform and the cells were slightly coarser than those of Example 3 which was judged to be the best product of the series of examples under discussion. However, by the use of more accelerator in the formulation of Example 6, an excellent product can be obtained. The product of Example 7, blown with di hydrazine sulfate, was excellent, having a fine, uniform cell structure of low density. The product of Example 8, made with hydrazine di hydrochloride, had a still coarser structure than that of Example 6 indicating that the rate of cure was much too slow allowing migration of the gas with the formation of large bubbles. As in the case of Example 6, Example 8 would yield an excellent product if more accelerator were used.

The products of Examples 9 to 14 were all of good quality and exhibited the fine uniform cell structure characteristic of the present invention.

*Example 15*

| | Parts by weight |
|---|---|
| Flat bark rubber | 100.0 |
| Whiting | 70.0 |
| Zinc oxide | 5.0 |
| Black pigment | 1.0 |
| Oleic acid | 23.5 |
| Retarder | .6 |
| Benzothiazyl disulfide | .75 |
| Paraffin oil | 11.0 |
| Sulfur | 4.0 |
| Sodium bicarbonate | 10.0 |
| Hydrazine hydrate (85%) | 2.5 |

The ingredients were compounded in accordance with the foregoing and blown to give an extremely low density cellular rubber having a density of 9.0 pounds per cubic foot. During the compounding, care was taken to intimately incorporate the hydrazine hydrate and the sulfur at separate times. The blown product had an unusually fine uniform structure and was much superior to a similar product made without the hydrazine hydrate.

*Examples 16 to 30*

A rubber master batch was made up in accordance with the following recipe:

| | Parts by weight |
|---|---|
| Pale crepe | 100.0 |
| Zinc oxide | 5.0 |
| Calcium carbonate (whiting) | 30.0 |
| Lithopone | 30.0 |
| Zinc salt of cocoanut fatty acids | 10.0 |
| Petrolatum | 10.0 |
| Sulfur | 3.0 |
| Bis (benzothiazole) disulfide | 1.0 |
| | 189.0 |

These components were combined and thoroughly mixed on a rubber mill in the usual manner. To separate portions of the above master batch were added the blowing agents of the invention in the proportions indicated in the following table:

| Example | 16 | 17 | 18 | 19 | 20 | 21 | 22 |
|---|---|---|---|---|---|---|---|
| Master batch | 189.0 | 189.0 | 189.0 | 189.0 | 189.0 | 189.0 | 189.0 |
| Di hydrazine oxalate (2:1) | 3.0 | | | | | | |
| Hydrazine mono benzoate (1:1) | | 3.0 | | | | | |
| Hydrazine mono acetate (1:1) | | | 3.0 | | | | |
| Mono hydrazine phosphate (1:1) | | | | 3.0 | | | |
| Hydrazine mono formate (1:1) | | | | | 3.0 | | |
| Hydrazine mono acetyl salicylate (1:1) | | | | | | 3.0 | |
| Hydrazine mono salicylate (1:1) | | | | | | | 3.0 |

| Example | 23 | 24 | 25 | 26 | 27 | 28 | 29 | 30 |
|---|---|---|---|---|---|---|---|---|
| Master batch | 189.0 | 189.0 | 189.0 | 189.0 | 189.0 | 189.0 | 189.0 | 189.0 |
| Di hydrazine malonate (2:1) | 3.0 | | | | | | | |
| Mono hydrazine oxalate (1:1) | | 2.0 | | | | | | |
| Hydrazine mono stearate (1:1) | | | 3.0 | | | | | |
| Mono hydrazine sulfate (1:1) | | | | 3.36 | | | | |
| Di hydrazine sulfate (2:1) | | | | | 2.0 | | | |
| Hydrazine carbazinate (1:1) | | | | | | 3.0 | | |
| Hydrazine dithiocarbazinate (1:1) | | | | | | | 3.0 | |
| Hydrazine (anhydrous) | | | | | | | | 2.0 |

(The parenthetical notation following the name of the blowing agents indicate the molecular ratio of hydrazine to acid.)

The stocks were thoroughly mixed on a rubber mill and sheeted out to a thickness of about 0.30–0.50 inch. Circular samples were cut with a die 2.875 inches in diameter. The weight of each sample was adjusted to 40 grams. The samples were then measured and placed in circular molds (3 inches in diameter by ¾ inch deep) and press-cured (with the exception of Example 29 which was cured 25 minutes at the temperature of steam at 40 pounds' pressure) for twenty minutes at the temperature of steam under pressure of sixty pounds per square inch. The stocks were removed from the mold and allowed to cool. They were then examined for sharpness of molding, thickness and diameter, and cure and were then cut open to reveal the cell structure and the color. The volume of the samples was determined by the water displacement method. Portions of most of the sponge samples were covered with a thin coat of white nitrocellulose base lacquer and the coated and uncoated portions were exposed to sunlight for observations on discoloration and staining. The data obtained is given in the following table:

| Example | 16—Oxalate (2:1) | 17—Benzoate (1:1) | 18—Acetate (1:1) |
|---|---|---|---|
| Before curing: | | | |
| Diameter (inches) | 2.875 | 2.875 | 2.875. |
| Thickness (inches) | 0.437 | 0.343 | 0.50. |
| Volume (cc.) (calculated) | 44 | 35 | 50. |
| After curing: | | | |
| Diameter | 2.875 | 2.906 | 2.906. |
| Thickness | 0.718 | 0.718 | 0.718. |
| Volume (cc.) (measured) | 79 | 81 | 79. |
| Cell structure | Fine, uniform. | Fine, uniform. | Fine, uniform. |
| Molding | Excellent | Excellent | Excellent. |
| Color | do | do | Do. |
| Lacquer stain | None | None | None. |
| Cure | Satisfactory | Satisfactory | Satisfactory. |

| Example | 19—Phosphate (1:1) | 20—Formate (1:1) | 21—Acetyl salicylate (1:1) |
|---|---|---|---|
| Before curing: | | | |
| Diameter (inches) | 2.875 | 2.875 | 2.875. |
| Thickness (inches) | 0.375 | 0.343 | 0.437. |
| Volume (cc.) (calculated) | 38 | 35 | 45. |
| After curing: | | | |
| Diameter (inches) | 2.875 | 2.875 | 2.875. |
| Thickness (inches) | 0.718 | 0.718 | 0.687. |
| Volume (cc.) (measured) | 79 | 79 | 78. |
| Cell structure | Fine, uniform. | Fine, uniform. | Fine, uniform. |
| Molding | Excellent | Excellent | Excellent. |
| Color | do | do | Do. |
| Lacquer stain | None | None | None. |
| Cure | Satisfactory | Satisfactory | Satisfactory. |

| Example | 22—Salicylate (1:1) | 23—Malonate (2:1) | 24—Oxalate (1:1) |
|---|---|---|---|
| Before curing: | | | |
| Diameter (inches) | 2.875 | 2.875 | 2.875. |
| Thickness (inches) | 0.437 | 0.375 | 0.343. |
| Volume (cc.) (calculated) | 45 | 38 | 33. |
| After curing: | | | |
| Diameter (inches) | 2.906 | 2.875 | 2.937. |
| Thickness (inches) | 0.718 | 0.687 | 0.718. |
| Volume (cc.) (measured) | 81 | 78 | 82. |
| Cell structure | Fine, uniform. | Fine, uniform. | Fine, uniform. |
| Molding | Excellent | Excellent | Excellent. |
| Color | do | do | Do. |
| Lacquer stain | None | None | None. |
| Cure | Satisfactory | Satisfactory | Satisfactory. |

| Example | 25—Stearate (1:1) | 26—Sulfate (1:1) | 27—Sulfate (2:1) |
|---|---|---|---|
| Before curing: | | | |
| Diameter (inches) | 2.875 | 2.718 | 2.812. |
| Thickness (inches) | 0.437 | 0.406 | 0.375. |
| Volume (cc.) (calculated) | 44 | 39 | 38. |
| After curing: | | | |
| Diameter (inches) | 2.812 | 2.937 | 2.937. |
| Thickness (inches) | 0.687 | 0.718 | 0.687. |
| Volume (cc.) (measured) | 70 | 70 | 79. |
| Cell structure | Fine, uniform. | Fine, uniform. | Fine, uniform. |
| Molding | Poor | Excellent | Excellent. |
| Color | Excellent | do | Do. |
| Lacquer stain | None | | |
| Cure | Satisfactory | Undercure | Satisfactory. |

| Example | 28—Carbazinate (1:1) | 29[1]—Dithiocarbazinate (1:1) | 30—Anhydrous hydrazine |
|---|---|---|---|
| Before curing: | | | |
| Diameter (inches) | 2.875 | 2.875 | 2.812. |
| Thickness (inches) | 0.468 | 0.470 | 0.375. |
| Volume (cc.) (calculated) | 50 | 50 | 38. |
| After curing: | | | |
| Diameter (inches) | 2.937 | 2.875 | 3.0. |
| Thickness (inches) | 0.781 | 0.750 | 0.812. |
| Volume (cc.) (measured) | 84 | 78 | 87. |
| Cell structure | Fine, uniform. | Fine, uniform. | Fine, uniform. |
| Molding | Excellent | Excellent | Excellent. |
| Color | do | do | Do. |
| Lacquer stain | None | None | |
| Cure | Satisfactory | Satisfactory | Satisfactory. |

[1] Cured 25 minutes at 40 p. s. i.

Example 31

In order to test the blowing properties of hydrazine salts in plastic materials a polyvinyl chloride plastisol was made up according to the following recipe:

|  | Grams |
|---|---|
| Polyvinyl chloride (VYVN-1) | 25 |
| Lead stearate | .75 |
| Mono hydrazine oxalate (1:1) | 6.0 |
| Tri octyl phosphate | 25 |

The first three materials were thoroughly mixed in a mortar and the tri octyl phosphate was then added gradually and the mixture worked well with a pestle until a plastisol was found. Sufficient plastisol was placed in both halves of a spherical mold (0.75" in diameter) to completely fill this mold. The mold was closed and placed in an electrically heated press at 330° F. Pressure of 2500 pounds per square inch (3" ram) was applied and the temperature was maintained near 350° F. for 12 minutes. The mold was cooled by replacing the steam in the platens with cold water. When the mold was thoroughly cooled the pressure was released, whereupon the mold was forced apart by the expanding plastic ball. The ball was considerably larger than the mold. It was placed in a wire cage under water at 85° for 30 minutes and then in boiling water for 15 minutes. The resulting ball, when cool, was considerably larger than the original mold and fine, uniform cell structure was revealed when the ball was cut.

It is somewhat surprising that mono hydrazine oxalate, which shows no sign of decomposition at 275° C. in a melting point tube, is capable of producing a blown rubber similar to that produced by an equivalent amount of dihydrazine oxalate which decomposes to gaseous products at 140° C. It is believed that the activity of the former compound in rubber must be associated with chemical changes which must occur in the presence of rubber and other compounding ingredients, particularly zinc oxide and stearic acid.

When cellular rubber is made in accordance with our invention, we prefer to employ a rubber compound having a relatively low Mooney viscosity compared to that commonly used in making solid rubber articles. The Mooney viscosity of the compounded rubber stock to be blown in accordance with our invention should not exceed a value of 30 at 212° F. and preferably has a value ranging from 10 to 15 when measured at 212° F. Such a relatively low Mooney viscosity is obtained by masticating the rubber either before, during or after compounding, in a Banbury mixer or on an open rubber mill until the Mooney viscosity has reached the desired low figure. As the Mooney viscosity of the compounded stock, preparatory to blow, is increased, the extent of blowing is reduced because of the inability of the gases liberated by the blowing agent to expand the highly viscous rubber stock. With a Mooney viscosity of about 30 it would be possible to obtain an expansion, upon blowing, of about 100% but such a blow is not acceptable commercially and for this reason use of stocks having the lower viscosity figure of 10 to 15 is much preferred.

One of the advantages of the present invention is that the hydrazine salt employed as blowing agent also exerts a substantial stiffening action upon the rubber during the blowing and cure, thus markedly tending to offset the low Mooney viscosity of the initial stock and giving a blown product having greater nerve, tear-resistance and strength.

We are aware of U. S. patent to Naylor 1,413,825 which shows the use of phenyl hydrazine as a blowing agent for rubber. However, phenyl hydrazine is subject to many objections. It is highly toxic because of the presence of the phenyl ring substituted on the hydrazine. It is very discoloring which prevents the attainment of the light colored products required commercially. It could not have been foreseen from the Naylor patent that unsubstituted hydrazine either as such or in the form of its hydrate or salts would produce the results discovered by us.

We are also familiar with U. S. patents to Williams et al. 2,018,643 and 2,018,644, Busse 2,136,373 and Gerke 2,315,850. The first-mentioned patent shows milling unvulcanized rubber with an unsymmetrically substituted hydrazine, such as phenyl hydrazine, to plasticize the rubber. The second-mentioned patent shows milling unvulcanized rubber with salts of unsymmetrically substituted hydrazine for the same purpose. The Busse patent shows softening unvulcanized rubber by mastication with hydrazine or hydrocarbon-substituted hydrazines such as phenyl hydrazine or beta-naphthyl hydrazine, or salts thereof with organic or inorganic acids. The Gerke patent shows mixing rubber with carbon black in the presence of hydrazine, heating the mix, and thereafter masticating the mix. However, in none of these patents is there any teaching or suggestion of the present invention. These patents are not concerned with making gas-expanded rubber and in fact carry out the incorporation of the hydrazine compound under conditions such that any gas liberated by the hydrazine compound would not be retained in the mixture.

From the foregoing it will be seen that the practice of the present invention is attended by many advantages. In addition to the unusually fine uniform structure of the cellular product, the blowing agents of the present invention have numerous other advantages. They are non-discoloring and non-staining. They exert no adverse effects upon the rubber or other plastic. They can be incorporated with the plastic or rubber mix in the usual manner provided the temperature be kept down and the blowing agent be added separately from the sulfur. In addition, they exhibit a marked stiffening effect upon rubber mixes, greatly increasing the nerve and decreasing the plasticity of the rubber, thereby offsetting the disadvantages of conventional practice in making gas-expanded rubber in which the rubber is milled to an objectionably low Mooney viscosity which is accompanied by an objectionable loss of nerve which is never adequately recovered. In contrast, the hydrazine blowing agents of our invention markedly stiffen the rubber mix simultaneously with the evolution of the blowing gas and expansion and curing of the mix, thereby giving a materially improved blown product. Numerous other advantages of the present invention will be apparent to those skilled in the art.

Having thus described our invention, what we claim and desire to protect by Letters Patent is:

1. The method of making vulcanized gas-expanded rubber which comprises incorporating a compound selected from the group consisting of hydrazine, hydrazine hydrate, hydrazine salts of carboxylic acids, hydrazine salts of inorganic acids, hydrazine dithiocarbazinate, hydrazine benzene sulfonate, hydrazine toluene sulfonate, hydrazine carbazinate and hydrazine salts of carbamic acids with a vulcanizable rubber mix comprising a sulfur-vulcanizable conjugated diene polymer rubber at a temperature below 160° F., the amount of said compound selected from said group being such as to provide from 0.1 to 5.0 parts of hydrazine base ($NH_2$—$NH_2$) per 100 parts of said rubber, incorporating in the mixture sulfur in amount sufficient to vulcanize said rubber together with other conventional rubber compounding ingredients to form a solid moldable rubber mixture, separately intimately incorporating said compound and said sulfur with the rubber mixture and thereby avoiding contact of high concentrations of said compound with high concentrations of said sulfur with consequent premature interaction, shaping the resulting solid rubber mixture containing said compound in undecomposed form to form a body of considerable thickness, subsequently heating the shaped mixture in a mold at a temperature sufficiently elevated and under such conditions as to effect simultaneous decomposition of said compound with evolution of gas by said compound and vulcanization of said rubber sufficiently to retain said gas and expanding said mixture to a cellular mass having a fine, uniform pore structure throughout.

2. The method of claim 1 wherein said compound is a hydrazine salt of an aliphatic monocarboxylic acid.

3. The method of claim 1 wherein said compound is hydrazine acetate.

4. The method of claim 1 wherein said compound is hydrazine stearate.

5. The method of claim 1 wherein said compound is a hydrazine salt of an aliphatic saturated polycarboxylic acid.

6. The method of claim 1 wherein said compound is hydrazine oxalate.

7. The method of claim 1 wherein said compound is dihydrazine oxalate.

8. The method of claim 1 wherein said compound is hydrazine sulfate.

9. The method of claim 1 wherein said compound is dihydrazine sulfate.

10. The method of claim 1 wherein said compound is hydrazine benzoate.

LESTER C. KULP.
EDWARD C. VAN BUSKIRK.
BYRON A. HUNTER.

REFERENCES CITED

The following references are of record in the file of this patent:

UNITED STATES PATENTS

| Number | Name | Date |
| --- | --- | --- |
| 1,990,925 | Bennett | Feb. 12, 1935 |
| 2,136,373 | Busse | Nov. 15, 1938 |
| 2,315,850 | Gerke | Apr. 6, 1943 |

OTHER REFERENCES

Bake: Du Pont Report No. 47-3 "Unicel ND," May 1947, 4 pages.

Vanderbilt: 1942 Rubber Handbook, page 27, 8th ed., published 1942 by R. T. Vanderbilt.

Turrentine: J. Am. Chem. Soc., 32, May 1910, pages 577–581, 587.

Mellor: "Modern Inorganic Chemistry," published 1917, page 550, Longmans Green & Co.